Oct. 22, 1963
W. SCHAAFSMA
3,107,487
ROCKET MOTOR
Filed Aug. 12, 1960
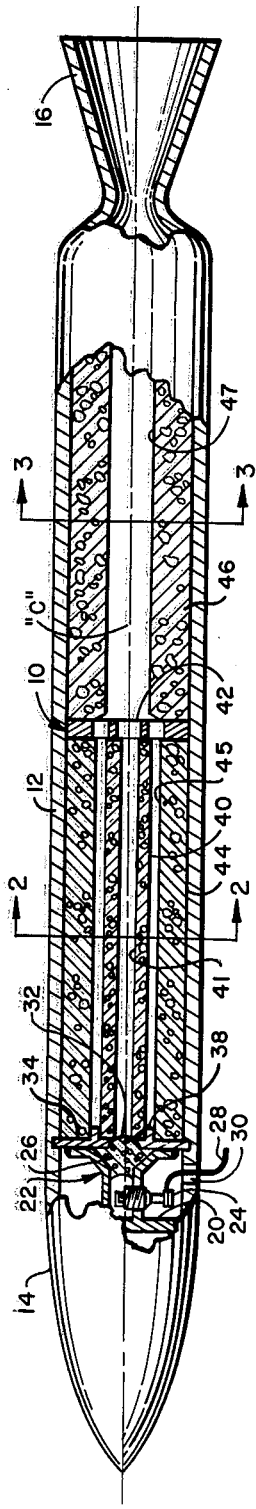
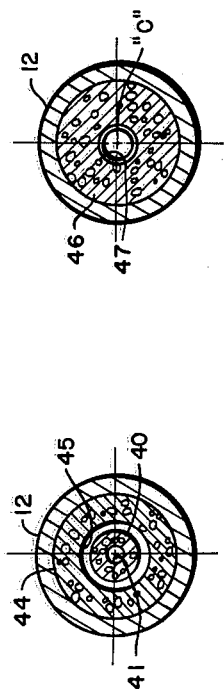
WILLEM SCHAAFSMA
INVENTOR
BY
ATTORNEY

United States Patent Office 3,107,487
Patented Oct. 22, 1963

3,107,487
ROCKET MOTOR
Willem Schaafsma, Los Altos, Calif., assignor to Aerojet-General Corporation, Azusa, Calif., a corporation of Ohio
Filed Aug. 12, 1960, Ser. No. 49,353
8 Claims. (Cl. 60—35.6)

This invention relates to rocket motors and more particularly to solid propellant rocket motors operating with a booster.

Certain rocket motors having missions to the outer atmosphere of the earth require booster charges to penetrate the dense atmospheric layers. Boosters have been used which are in essence a second rocket motor that is fixedly attached to the main rocket motor casing. Externally positioned boosters create the inherent problems of disposal of the spent booster casing, alignment of the booster casings in relation to the main rocket motor, and attachment of the booster casings to the main rocket casing.

Accordingly, it is an object of the present invention to provide a rocket motor having an integral booster charge.

Other objects and advantages of the present invention, including simplicity and cheapness of manufacture, and convenience in use, will be apparent as the description herein progresses.

The foregoing and other objects, embodiments, and features of my invention will be more readily understood by reference to the accompanying drawings in which:

FIGURE 1 is a partial cross section of the rocket motor constructed in accordance with my invention;

FIGURE 2 is a cross sectional view through the booster and forward main charges taken on the line 2—2 on FIGURE 1; and FIGURE 3 is a cross sectional view through the rear main charge taken on the line 3—3 on FIGURE 1.

Referring to all the figures, the rocket motor 10 has a substantially cylindrical body 12 and a nose section 14 at its forward portion and a nozzle 16 fixedly attached to its rearward portion. The body section is substantially cylindrical and may contain variations such as fins or direction vanes which can alter the projectory of the rocket in flight.

The nose section 14 is fixedly attached to the body portion 12 and is sealed from the body portion by the plate 20. A payload may be placed within the nose section 14 for any desired reason.

The igniter 22 is fixedly attached to the plate 20 and is positioned in the forward portion of the rocket for convenience sake. Any commercial type of igniter may be used such as, glow plugs, primacord connections, or other common igniter elements. For purposes of illustration, a glow plug 24 is fixedly attached to the igniter body 26 and has an electrical lead 28 connected to it which in turn is led externally of the rocket body 12 through the orifice 30. The igniter body also contains the igniter assembly 22 which contains a pyrotechnic material 32 which also may be items such as: black powder, aluminum, potassium perchlorate, etc. A suitable igniter is disclosed in a patent application now under a "Notice of Allowability" having the Serial No. 306,030, filed August 23, 1952, now Patent No. 3,000,312, and the inventor is Ernest R. Roberts, and assigned to the assignee of the present application.

The igniter body 26 is fixedly attached to the support plate 20 by such means as welding. An annulus-shaped plate 34 is fixedly attached to the forward portion of the rocket body 12 and has thereon projection 38 which supports the booster charge 40. Booster charge 40 is in the form of a tubular element and is nested within the projection 38 of the plate 34. The opposite end of the booster 40 is supported by the central portion of the second plate 42. A circular passageway 41 within the booster charge 40 is formed concentric with the center line "C" of the rocket motor 10. A centrally located passageway is formed in the second plate 42 and is positioned concentric with passageway 41. A plurality of additional passageways in plate 41 are positioned around the central passageway thereby providing a means for exhaust of hot gases generated between the booster charge 40 and the forward main charge 44. The passageway 41 facilitates the ignition of the booster charge 40 along its entire length. The forward main charge 44 surrounds the booster charge 40 and is also nested within the forward plate 34 and second plate 42. The forward main charge 44 is in spaced relationship with the booster charge 40.

A second or rear main charge 46 is nested within the rocket body 12, between the second plate 42 and the nozzle 16. Both the forward and rearwardly positioned main charges 44, 46 may be cast in an external container and later positioned within the rocket housing after proper curing. An alternative method of constructing the main charges is to cast them directly within the casing.

The passageways 45, 47 in the forward and rear charges 44, 46, respectively, may be circular in cross section or any other desired configuration which may be beneficial for a predetermined burning rate of the forward and rear charges 44, 46.

As a matter of convenience, the booster charge 40, the forward and rear main charges 44, 46 are concentric with the center line "C" of the rocket motor 10. Passageways 41, 45, 47 are also concentric with the center line "C."

An example of the dual-thrust rocket in actual physical sizes and shapes, given for purposes of illustration only and not by way of limitation, is as follows:

Over-all length 136", diameter 8.25, propellant weight 205 pounds total, booster grain 17 pounds, forward main grain 52 pounds, aft main grain 136 pounds. Having the aforesaid rocket characteristics, the total impulse is 41,000 pound seconds and the duration of impulse at 60° F. is 14 seconds. Examples of propellants used for the booster and main charges are disclosed in patent application Serial No. 109,409, filed August 9, 1949, now Patent No. 3,031,288 and the inventor is Ray F. Roberts. The application is now under a "Notice of Allowability" and is assigned to the assignee of the present application. The propellants used to obtain the above-stated rocket performance are Example 8, as the booster, and Example 10, as the main charge, as stated in the above-identified patent application.

The operating temperature range of the rocket motor is —40 to 140° F. The initial maximum acceleration is 27 G at 140° F. Using these physical dimensions the calculated summit altitude at 60° F. is 188,000 feet. A comparable summit altitude operating at 140° F. is 170,000 feet.

The operation of the rocket motor is as follows: The rocket motor is placed on a launching platform and directed in a desired trajectory. The igniter 26 is connected to a source of current via the electrical wire 28. Upon ignition of the glow plug 24 the pyrotechnic material 32 in turn ignites and thereafter burns at a controlled rate. Since the pyrotechnic material is in direct contact with the central passageway 41 of the booster charge 40 the detonation of the igniter thereafter ignites the booster. As the booster charge 40 is being consumed the rocket 10 is given its initial thrust and also ignites the rearward main propellant charge. The booster charge 40 generates a higher pressure than that generated by the main propellant charges 44, 46 and therefore requires a higher optimum expansion ratio within the nozzle.

While the particular embodiment of the invention has been illustrated and described, it will be obvious to those skilled in the art that various changes and modifications may be made without departing from the invention. It is intended to cover in the apended claims all such changes and modifications that come within the true spirit and scope of this invention.

I claim:

1. A dual-thrust rocket motor comprising: a casing receiving a main propellant charge, said main propellant charge having a passageway therethrough, an annulus shaped booster propellant charge received within the said main propellant charge passageway and in spaced relation thereto, an igniter operatively associated with the said booster propellant charge and said main propellant charge, and a nozzle fixedly attached to said casing.

2. A rocket motor comprising: a hollow cylindrical casing having a forward and rearward portion and a longitudinal axis, a nozzle fixedly attached and operatively associated with the rearward portion of said casing, a plurality of substantially cylindrically-shaped main propellant charges received by said casing and arranged in end-to-end relatonship from the forward portion to the rearward portion of said casing and concentric with the casing longitudinal axis, each of said main propellant charges having a passageway therethrough concentric with the casing longitudinal axis, a booster propellant charge received within a main propellant charge passageway and positioned in the forward portion of said casing, and an igniter means in juxtaposition to said booster propellant charge.

3. A rocket motor as defined in claim 2 in which the said booster propellant charge is substantially cylindrically-shaped and arranged concentric with said casing longitudinal axis and in spaced relation to said main propellant charge passageway.

4. A rocket motor as defined in claim 2 in which the booster propellant charge has a passageway therethrough concentric with the casing longitudinal axis.

5. A rocket motor as defined in claim 2 in which the plurality of main propellant charges contact the casing walls.

6. A rocket motor as defined in claim 2 in which the nozzle is arranged concentric with the casing longitudinal axis.

7. A rocket motor comprising: a hollow cylindrical casing having a forward and rearward portion and a longitudinal axis, a nozzle fixedly attached and operatively associated with the rearward portion of said casing, a plurality of substantially cylindrically-shaped main propellant charges received by said casing and arranged in end-to-end relationship from the forward portion to the rearward portion of said casing and concentric with the casing longitudinal axis, a first perforated plate centrally received by said casing and positioned between and abutting the said plurality of main propellant charges, each of said main propellant charges having a passageway therethrough concentric with the casing longitudinal axis, a booster propellant charge received within a main propellant passageway and positioned in the forward portion of said casing, said booster charge abutting said first plate, a second perforated plate received in the forward portion of said casing and fixedly attached thereto, said second plate abutting said main propellant charge and the booster propellant charge, and an igniter means in juxtaposition to said booster propellant charge.

8. The rocket motor as defined in claim 7 in which the said igniter means is fixedly attached to said second plate.

References Cited in the file of this patent

UNITED STATES PATENTS

| 2,390,635 | Barker et al. | Dec. 11, 1945 |
| 2,724,237 | Hickman | Nov. 22, 1955 |
| 2,959,001 | Porter | Nov. 8, 1960 |
| 2,988,877 | Shope | June 20, 1961 |

FOREIGN PATENTS

| 659,758 | Great Britain | Oct. 24, 1951 |

OTHER REFERENCES

"Why Not Dual-Thrust Engines?" by R. S. Newman, Astronautics, March 1958, pages 26–28, 48 and 49.